US007620103B2

(12) United States Patent
Cote et al.

(10) Patent No.: US 7,620,103 B2
(45) Date of Patent: Nov. 17, 2009

(54) PROGRAMMABLE QUANTIZATION DEAD ZONE AND THRESHOLD FOR STANDARD-BASED H.264 AND/OR VC1 VIDEO ENCODING

(75) Inventors: Guy Cote, Elora (CA); Elliot N. Linzer, Suffern, NY (US); Lowell L. Winger, Waterloo (CA)

(73) Assignee: LSI Corporation, Milpitas, CA (US)

( * ) Notice: Subject to any disclaimer, the term of this patent is extended or adjusted under 35 U.S.C. 154(b) by 1014 days.

(21) Appl. No.: 11/010,029

(22) Filed: Dec. 10, 2004

(65) Prior Publication Data

US 2006/0126724 A1 Jun. 15, 2006

(51) Int. Cl.
*H04N 7/30* (2006.01)
*H04N 7/50* (2006.01)
(52) U.S. Cl. .............................. 375/240.03; 375/240.04
(58) Field of Classification Search ............. 375/240.03
See application file for complete search history.

(56) References Cited

U.S. PATENT DOCUMENTS

| 4,969,040 A | * | 11/1990 | Gharavi | ................. | 375/240.11 |
| 5,214,502 A | * | 5/1993 | Stone et al. | ................. | 348/472 |
| 2004/0179608 A1 | * | 9/2004 | Holliman et al. | ....... | 375/240.25 |
| 2005/0041738 A1 | * | 2/2005 | Lin et al. | ............... | 375/240.03 |

OTHER PUBLICATIONS

Tao, B. "On Optimal Entropy-Constrained Deadzone Quantization". _IEEE Trans. on Cir. and Sys. for Video Tech._ 11.4 (Apr. 2001): pp. 560-563.*

Microsoft Corporation, "Windows Media Video V9 Decoding Specification", SS.3.1—3.2.1.5 (received Jul. 18, 2003).*

Microsoft Corporation, "Windows Media Video 9 Series Codecs" (created Apr. 11, 2006).*

Swiss Federal Institute of Technology, "Architectures for Video Processing" (created Jun. 12, 2002).*

ITU-Telecommunications Standardization Sector, Study Group 16 Question 6, Video Coding Experts Group (VCEG), $15^{th}$ Meeting: Pattaya, Thailand, Dec. 4-6, 2001, pp. 1-11.

ITU-Telecommunications Standardization Sector, Study Group 16 Question 6, Video Coding Experts Group (VCEG), $14^{th}$ Meeting: Santa Barbara, CA, USA, Sept. 24-28, 2001, pp. 1-18.

Joint Video Team (JVT) of ISO/IEC MPEG & ITU-T VCEG (ISO/IEC JTC1/SC29/WG11 and ITU-T SG16 Q.6), $2^{nd}$ Meeting: Geneva, CH, Jan. 29-Feb. 1, 2002, pp. 1-18.

* cited by examiner

*Primary Examiner*—Andy S Rao
*Assistant Examiner*—David N Werner
(74) *Attorney, Agent, or Firm*—Christopher P. Maiorana, PC

(57) ABSTRACT

A video encoder is disclosed that includes an encoder circuit, a quantizer circuit and a control circuit. The encoder circuit may be configured to generate a number of coefficient values in response to a video stream and a number of quantized values. The quantizer circuit may be configured to generate the number of quantized values in response to the coefficient values, two or more quantization dead zones and two or more offsets. The control circuit may be configured to set the two or more quantization dead zones and the two or more offsets to different values. The two or more quantization dead zones and the two or more offsets are independently programmable.

24 Claims, 3 Drawing Sheets

PROGRAMMABLE QUANTIZATION DEAD ZONE AND THRESHOLD FOR STANDARD-BASED H.264 AND/OR VC1 VIDEO ENCODING

FIELD OF THE INVENTION

The present invention relates to video encoding generally and, more particularly, to a programmable quantization dead zone and threshold for standard-based H.264 and/or VC1 video encoding.

BACKGROUND OF THE INVENTION

Video picture quality can be decreased by aliasing. Aliasing refers to defects or distortion in a video picture due to sampling limitations. The defects commonly appear as jagged edges on diagonal lines and twinkling or brightening (beating/pulsing) in picture detail.

In the H.264 specification, I-frame beating/pulsing is a significant problem, more so than with other video compression standards. The main source of the problem in H.264 is poor DC quantization in the coded bit stream. Poor DC quantization occurs because the H.264 specification does not provide explicit syntax to support finer DC quantization (i.e., quantization matrices and/or DC quantization).

The VC1 specification has separate quantization for AC and DC coefficients. However, VC1 does not have separately controllable quantization for every separate frequency component. The quantization of lower frequency AC coefficients can be relatively poor in VC1.

It would be desirable to implement a video encoder with a programmable quantization dead zone and thresholds for standard-based H.264 and/or VC1 video encoding.

SUMMARY OF THE INVENTION

The present invention concerns a video encoder comprising an encoder circuit, a quantizer circuit and a control circuit. The encoder circuit may be configured to generate a number of coefficient values in response to a video stream and a number of quantized values. The quantizer circuit may be configured to generate the number of quantized values in response to the coefficient values, two or more quantization dead zones and two or more offsets. The control circuit may be configured to set the two or more quantization dead zones and the two or more offsets to different values. The two or more quantization dead zones and the two or more offsets are independently programmable.

The objects, features and advantages of the present invention include providing programmable quantization dead zones and thresholds for standard-based H.264 and/or VC1 video encoding that may (i) adjust quantization dead zones, (ii) adjust quantization decision levels (or thresholds), (iii) improve I-frame visual quality, (iv) reduce I-frame beating and/or pulsing, (v) improve quantization of lower frequency AC coefficients in VC1, (vi) improve rate-distortion performance and/or (vii) improve overall visual quality.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
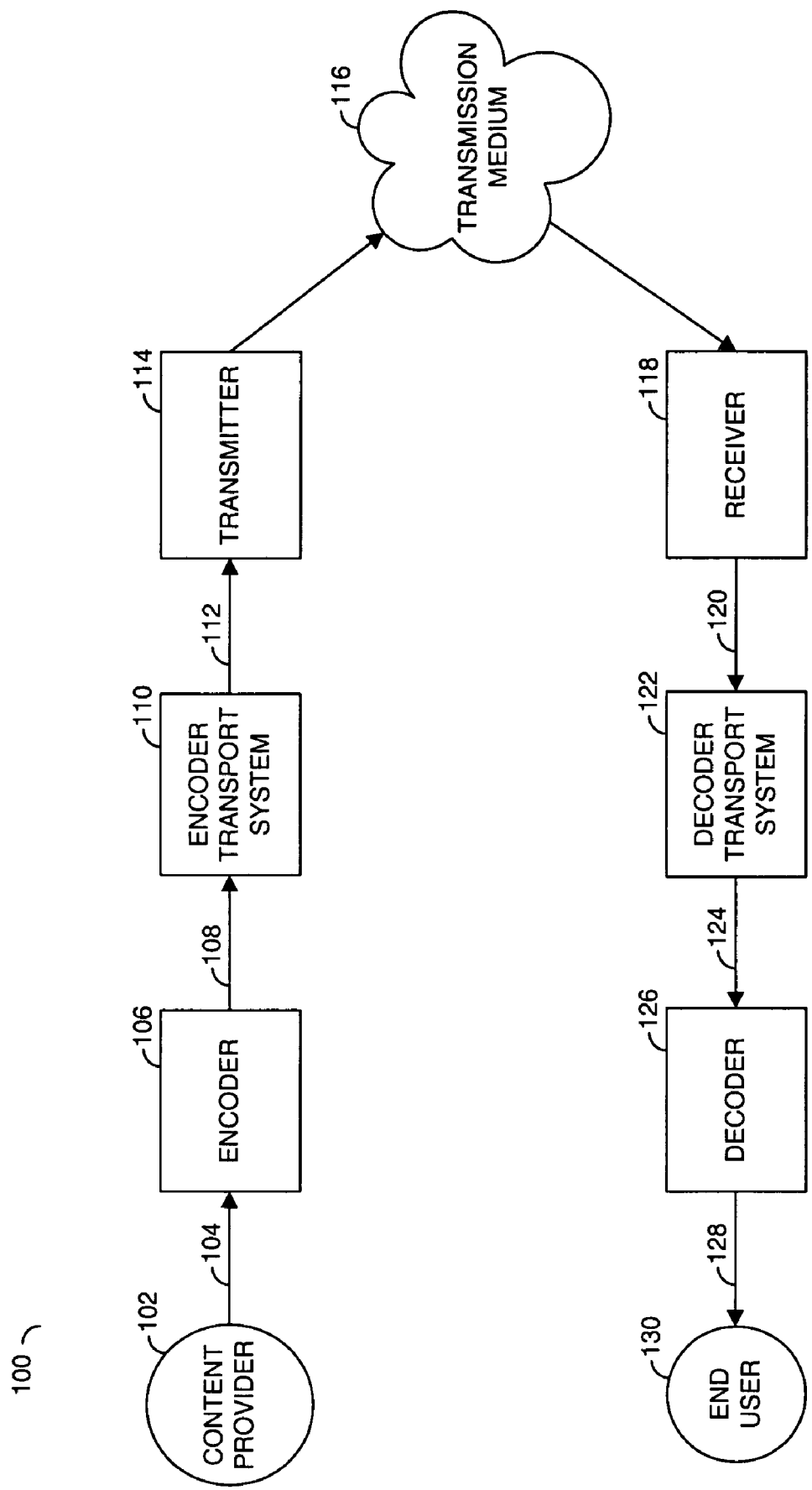
FIG. 1 is a block diagram illustrating various components of a compressed video system in accordance with a preferred embodiment of the present invention.

Referring to FIG. 1, a block diagram of a system 100 is shown illustrating components of a compressed video system in accordance with a preferred embodiment of the present invention. In general, a content provider 102 presents video image, audio or other data to be compressed and transmitted in a data stream 104 to an input of an encoder 106. The encoder 106 may be configured to generate a compressed bit stream 108 in response to the input stream 104. In one example, the encoder 106 maybe configured to encode the data stream 104 according to one or more encoding standards (e.g., MPEG-1, MPEG-2, MPEG-4, WMV, VC-9, VC-1, H.262, H.263, H.264, H.264/JVC/AVC/MPEG-4 part 10, AVS 1.0 and/or other standards for compression of audio-video data). The encoder 106 may be further configured to generate the bit stream 108 using a quantization process implemented with a programmable dead zone and thresholds.

The compressed bit stream 108 from the encoder 106 may be presented to an encoder transport system 110. An output of the encoder transport system 110 generally presents a signal 112 to a transmitter 114. The transmitter 114 transmits the compressed data via a transmission medium 116. In one example, the content provider 102 may comprise a video broadcast, DVD, or any other source of video data stream. The transmission medium 116 may comprise, for example, a broadcast, cable, satellite, network, DVD, hard drive, or any other medium implemented to carry, transfer, and/or store a compressed bit stream.

On a receiving side of the system 100, a receiver 118 generally receives the compressed data bit stream from the transmission medium 116. The receiver 118 presents an encoded bit stream 120 to a decoder transport system 122. The decoder transport system 122 generally presents the encoded bit stream via a link 124 to a decoder 126. The decoder 126 generally decompresses (decodes) the data bit stream and presents the data via a link 128 to an end user hardware block (or circuit) 130. The end user hardware block 130 may comprise a television, a monitor, a computer, a projector, a hard drive, a personal video recorder (PVR), an optical disk recorder (e.g., DVD), or any other medium implemented to carry, transfer, present, display and/or store the uncompressed bit stream (e.g., decoded video signal).

Figure 2:
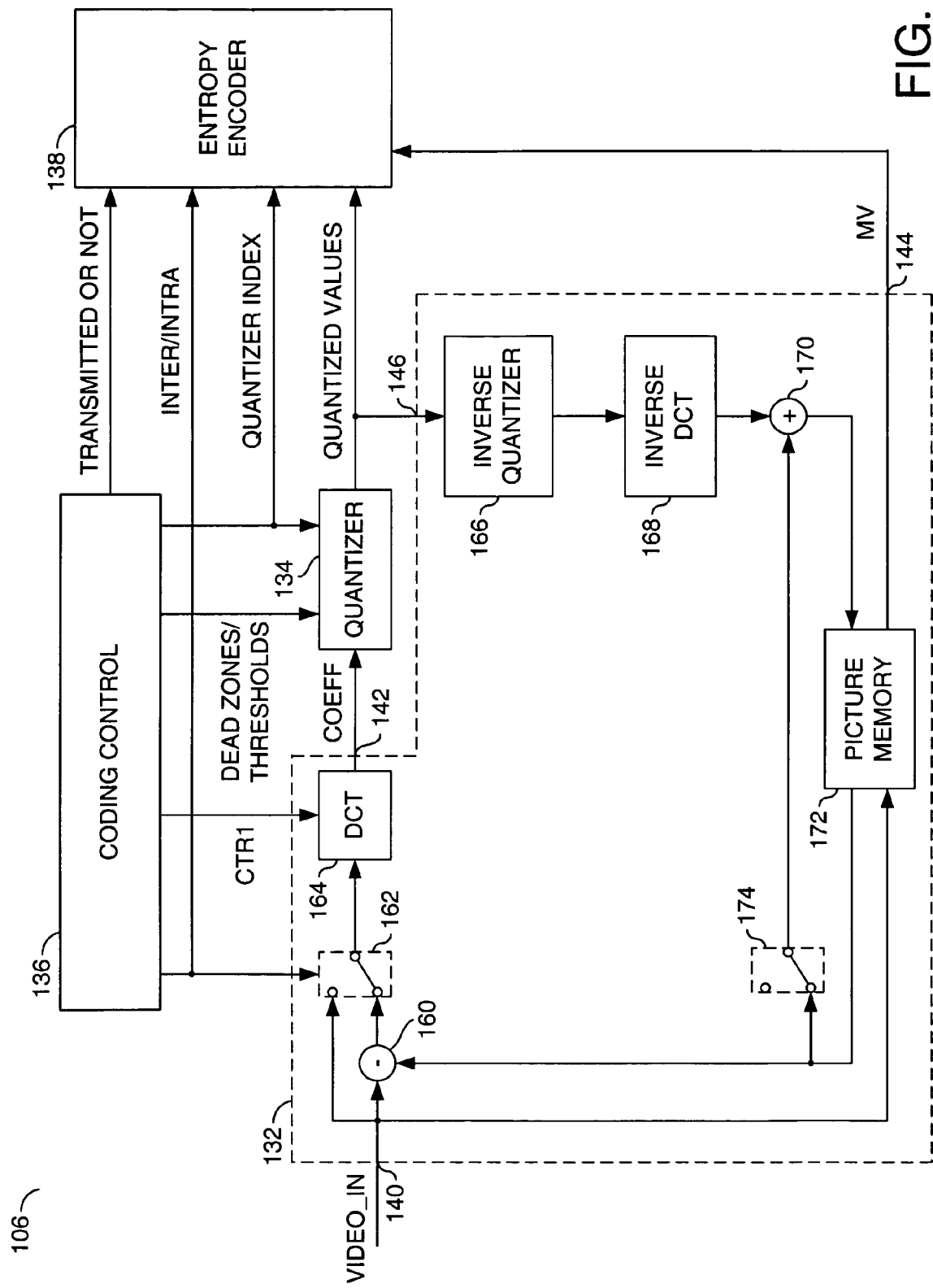
FIG. 2 is a more detailed block diagram illustrating a video encoder in accordance with a preferred embodiment of the present invention.

Referring to FIG. 2, a more detailed block diagram of the circuit 106 of FIG. 1 implemented in accordance with a preferred embodiment of the present invention is shown. The circuit 106 may be implemented as a video encoder. In one example, the circuit 106 may be compliant with one or more compression standards (e.g., H.264, VC1, and/or other specifications). The present invention generally relates to encoding rules for forward quantization. The present invention generally provides a flexible design for a quantization process that may achieve better video compression in standard based video encoding.

The circuit 106 may comprise a circuit (or block) 132, a circuit (or block) 134, a circuit (or block) 136 and a circuit (or block) 138. The block 132 may be implemented as an encoder/decoder (CODEC) circuit. The block 134 may be implemented as a quantizer circuit. The block 136 may be implemented as a coding control circuit. the block 138 may be implemented as an entropy coding block.

The circuit 132 may have an input 140 that may receive a signal (e.g., VIDEO IN), an output 142 that may present a signal (e.g., COEFF), an output 140 that may present a signal (e.g., MV) and an input 146 that may receive a signal (e.g., QUANTIZED VALUES). The signal VIDEO IN may comprise a video bit stream. The signal QUANTIZED VALUES may comprise a number of quantized values for transform coefficients. The signal MV may comprise a number of motion vectors. The block 132 may be configured to generate the signal COEFF and the signal MV in response to the signal VIDEO IN, the signal QUANTIZED VALUES and one or more control signals (e.g., CTR1 and INTER/INTRA) received from the block 136. In general, the block 132 may be implemented with conventional techniques.

The circuit 134 may have a first input that may receive the signal COEFF, a second input that may receive a signal (e.g., DEAD ZONES/THRESHOLDS), a third input that may receive a signal (e.g., QUANTIZER INDEX) and an output that may present the signal QUANTIZED VALUES. The signal DEAD ZONES/THRESHOLDS may be configured to signal (or set) quantization dead zones and thresholds of the circuit 134. The signal DEAD ZONES/THRESHOLDS may comprise information for programming one or more quantization dead zones and/or thresholds. In one example, the signal DEAD ZONES/THRESHOLDS may be configured to select between a number of predetermined quantization parameters. The circuit 134 may be configured to generate the signal QUANTIZED VALUES in response to the signal COEFF, the signal DEAD ZONES/THRESHOLDS and the signal QUANTIZER INDEX.

The circuit 136 may have a first output that may present the control signal CTR1, a second output that may present the signal DEAD ZONES/THRESHOLDS, a third output that may present the signal QUANTIZER INDEX, a fourth output that may present the signal INTER/INTRA and a fifth output that may present a signal (e.g., TRANSMITTED OR NOT). The signal INTER/INTRA may be implemented, in one example, as a decision flag. The signal TRANSMITTED OR NOT may be implemented, in one example, as a status flag. The signal CTR1 may be configured, in one example, to control a transformation process of the block 132. For example, the signal CTR1 may be configured to select between 8×8 and 4×4 transforms.

The circuit 136 may be configured, in one example, to generate the signals CTR1, INTER/INTRA, TRANSMITTED OR NOT, and QUANTIZER INDEX according to conventional techniques. The circuit 136 may be further configured, in one example, to generate the signal DEAD ZONES/THRESHOLDS in accordance with the present invention. In one example, the circuit 136 may be configured to generate the signal DEAD ZONE/THRESHOLDS using a number of different algorithms.

For example, the signal DEAD ZONES/THRESHOLDS may be varied for each macroblock, or may be fixed. In one example, statistics (e.g., mean, variance, etc.) of the original macroblocks (e.g., for intra or inter) or residual macroblocks (e.g., for inter) may be utilized to determine offset and threshold values. In another example, the offset and threshold values may be determined empirically (e.g., by experimentation). In one example, fixed values may be used for intra and inter, or fixed for a specific sequence type. For example, a video sequence classification may be used to determine the offset and/or threshold values. Also, quantization alone may be performed repeatedly with different values. In one example a measure of rate-distortion performance may be used in determining offset and threshold values. For example, a set of offset and threshold values may be selected for determining final quantized coefficients from a plurality of sets based on obtaining the best rate-distortion performance.

The block 138 may be implemented using conventional techniques. In one example, the block 138 may be configured to generate a compressed bit stream using one or more of variable length codes (VLC), context-adaptive variable length coding (CAVLC) and/or context-adaptive binary arithmetic coding (CABAC). The block 138 may be configured to generate the compressed bit stream in response to the signals INTER/INTRA, TRANSMITTED OR NOT, QUANTIZER INDEX, QUANTIZED VALUES and MV.

In one example, the circuit 132 may comprise a block (or circuit) 160, a block (or circuit) 162, a block (or circuit) 164, a block (or circuit) 166, a block (or circuit) 168, a block (or circuit) 170, a block (or circuit) 172 and a block (or circuit) 174. The block 160 may be implemented as a subtractor. The block 162 may be implemented as a multiplexer (or selector) circuit. The block 164 may be implemented as a transform block. In one example, the block 164 may be configured to perform a discrete cosine transform (DCT). The block 166 may be implemented as an inverse quantizer block. The block 168 may be implemented as an inverse transform block. In one example, the block 168 may be implemented as an inverse discrete cosine transform (IDCT) block. The block 170 may be implemented as an adder. The block 172 may be implemented as a picture memory. The block 174 may be implemented as a multiplexer (or selector) circuit. Other blocks or circuits may be implemented accordingly to meet the design criteria of a particular implementation.

The signal VIDEO_IN may be presented to a first input of the block 160 and a first input of the block 162. An output of the block 160 may present a signal to a second input of the block 162. The block 162 may be configured to couple either the first input or the second input to an output in response to the signal INTER/INTRA. The output of the block 162 may be presented to an input of the block 164. The block 164 may be configured to transform the signal received from the block 162 based upon the signal CTR1. An output of the block 164 may present the signal COEFF.

The block 166 may have an input that may receive the signal QUANTIZED VALUES. An output of the block 166 may be presented to an input of the block 168. An output of the block 168 may be presented to a first input of the block 170. An output of the block 170 may be presented to a first input of the block 172. The block 172 may have a first output that may present the signal MV, a second input that may receive the signal VIDEO IN and a second output that may present a signal to a second input of the block 160 and a first input of the block 174. An output of the block 174 may be presented to a second input of the block 170. The blocks 160-174 may be implemented using conventional techniques for block-based video encoders. Motion estimation and compensation may be implemented with conventional techniques. However, the implementation of motion estimation and compensation may vary substantially from one encoder to another encoder to meet the design criteria of a particular implementation.

Video compression standards (e.g., MPEG2, MPEG4, H.264, VC1, etc.) generally define a video decoder syntax and decoding process. As part of the decoding process, inverse quantization is generally defined in the standard. However, video encoding implementation is generally more flexible. For example, different encoders may implement forward quantization rules differently. Quantization as used herein generally refers to the process of assigning a range of coefficient levels to a predetermined reconstructed level that may be obtained from a quantization parameter.

Figure 3:
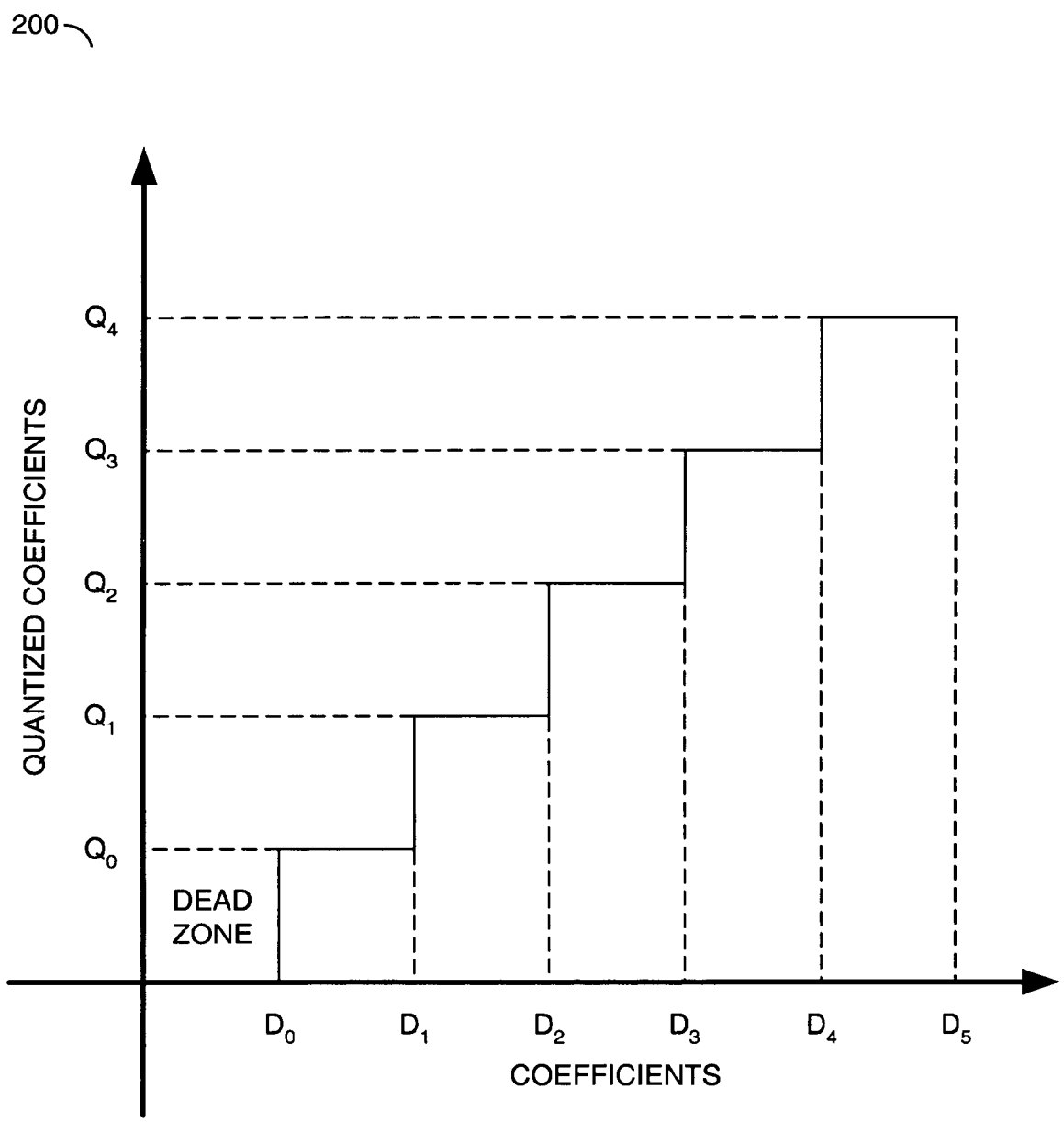
FIG. 3 is a diagram illustrating an example of forward quantization parameters.

Referring to FIG. 3, a diagram 200 is shown illustrating an example relationship between quantization parameters and coefficient levels. In general, coefficient values falling within a pair of decision thresholds (e.g., $[D_n, D_{n+1}]$) are generally assigned a corresponding quantized value (e.g., $Q_n$). Conventional implementations of forward quantization have fixed decision thresholds. The present invention generally provides a process for forward quantization that allows for varying the decision thresholds $D_1$-$D_n$ (also called "offsets") and the decision threshold $D_0$ around zero (also called "dead zone") independently for (i) all coefficients, (ii) luminance blocks and/or (iii) chrominance blocks.

In one example, a different quantization dead zone and a different quantization offset may be selected for different coefficients in a block. For example, a first coefficient in a block may be quantized using a first offset threshold value and a first dead zone threshold value. A second coefficient in the block may be quantized using a second offset threshold value and/or a second dead zone threshold value. The first and second offset values may be independently programmed. The first and second dead zone values may be independently programmed. The dead zone threshold values and offset threshold values may be independently programmed to different values.

In one example, the present invention may be implemented in an H.264 compliant encoder/decoder. In general, H.264 uses a 4×4 transform. The 4×4 transform produces 16 coefficients per block. H.264 also uses one luminance (luma or Y) and two chrominance (Cb an Cr) blocks for a 4×4 pixel area. H.264 may also implement 16×16 blocks. In H.264, the DC transformed coefficients for a 16×16 block are generally grouped into a 4×4 block of DC coefficients, and transformed and quantized again. In a preferred embodiment of the present invention, a different set of offsets and dead zone may be implemented for the latter step. In another example, the present invention may be implemented in a VC-1 compliant encoder/decoder. Examples of a transform/quantization process in accordance with preferred embodiments of the present invention are presented below.

In one example, an encoder in accordance with the present invention may implement H.264 forward transform and quantization similar to that described in the Joint Video Team (JVT) document JVT-B039.doc entitled "Low Complexity Transform and Quantization—Part II: Extensions" (which is hereby incorporated by reference in its entirety) with the exception of (i) material regarding residuals >9 bits, (ii) proposed changes to the standard that were not adopted and (iii) implementation of programmable offsets and thresholds. As used herein, the symbol // denotes division with rounding to the nearest integer:

$$a//2^b = sign(a) \times [(abs(a) + 2^{b-1}) >> b]$$

Quantization in accordance with the present invention may be implemented, in one example, with 126-bits for programmable parameter sets (e.g., 18 3-bit offsets and 18 4-bit deadzones). In one example, the present invention may implement 16 parameter sets for 8×8 or 4×4 luma and chroma quantization (e.g., $O_{ij}$ and $d_{ij}$), 1 parameter set for 2×2 chroma DC quantization (e.g., $O_{CDC}$ and $d_{CDC}$), and 1 parameter set for 4×4 luma DC quantization (e.g., $O_{LDC}$ and $d_{LDC}$).

In one example, a forward transform for 4×4 luma and chroma may be defined by the following equation:

$$Y = \begin{bmatrix} 1 & 1 & 1 & 1 \\ 2 & 1 & -1 & -2 \\ 1 & -1 & -1 & 1 \\ 1 & -2 & 2 & -1 \end{bmatrix} \begin{bmatrix} x_{00} & x_{01} & x_{02} & x_{03} \\ x_{10} & x_{11} & x_{12} & x_{13} \\ x_{20} & x_{21} & x_{22} & x_{23} \\ x_{30} & x_{31} & x_{32} & x_{33} \end{bmatrix} \begin{bmatrix} 1 & 2 & 1 & 1 \\ 1 & 1 & -1 & -2 \\ 1 & -1 & -1 & 2 \\ 1 & -2 & 1 & -1 \end{bmatrix}$$

Quantization for the 4×4 luma and chroma may be performed according to the following equation:

$$Y_{QQ}(i, j) = [Y(i, j) \cdot Q(QP\%6, i, j) + (((Off(i, j) + 1) \cdot 2^{17+QP/6})/16)]/2^{17-3+QP/6}, i, j = 0 \ldots 3$$

$$Y_Q(i, j) = \begin{cases} 0, & \text{if } abs(Y_{QQ}(i, j)) \le 7 + DZ(i, j) \\ Y_{QQ}(i, j)/8, & \text{else} \end{cases}$$

where Y represents the transformed coefficients, Q represents the quantization coefficients, Off(i,j) has the same sign as the coefficient that is being quantized and a value +1 is added to the parameter Off(i,j). In one example, the quantization coefficients Q may be set as follows:

Q[QP %6][i][j]=quantMat[QP %6][0] for (i,j)={(0,0), (0,2), (2,0), (2,2)},

Q[QP %6][i][j]=quantMat[QP %6][1] for (i,j)={(1,1), (1,3), (3,1), (3,3)},

Q[QP %6][i][j]=quantMat[QP %6][2] otherwise.

R[QP %6][i][j]=dequantMat[QP %6][0] for (i,j)={(0,0), (0,2), (2,0), (2,2)},

R[QP %6][i][j]=dequantMat[QP %6][1] for (i,j)={(1,1), (1,3), (3,1), (3,3)},

R[QP %6][i][j]=dequantMat[QP %6][2] otherwise.

quantMat[6][3]={{13107, 5243, 8066}, {11916, 4660, 7490}, {10082, 4194, 6554}, {9362, 3647, 5825}, {8192, 3355, 5243}, {7282, 2893 , 4559}};

dequantMat[6][3]={{10, 16, 13}, {11, 18, 14}, {13, 20, 16}, {14, 23, 18}, {16, 25, 20}, {18, 29, 23}}.

The sixteen 3-bit programmable offsets $O_{ij}$ for 4×4 luma and chroma quantization may be utilized according to the following equation:

$$Off(i, j) = sgn(Y(i, j)) \cdot O_1(i, j), \text{ where } O_1 = \begin{bmatrix} o_{00} & o_{01} & o_{02} & o_{03} \\ o_{10} & o_{11} & o_{12} & o_{13} \\ o_{20} & o_{21} & o_{22} & o_{23} \\ o_{30} & o_{31} & o_{32} & o_{33} \end{bmatrix}$$

where $O_{ij}$=0 . . . 7. For example, for smaller sum of absolute differences (SAD) blocks and/or non-reference blocks (e.g. B-frames), $O_1$ may be implemented as follows:

$$O_1 = \begin{bmatrix} 7 & 3 & 3 & 1 \\ 3 & 3 & 3 & 1 \\ 3 & 3 & 3 & 1 \\ 1 & 1 & 1 & 1 \end{bmatrix}$$

while for all other cases, $O_1$ may have the following value:

$$O_1 = \begin{bmatrix} 7 & 5 & 5 & 3 \\ 5 & 5 & 5 & 3 \\ 5 & 5 & 5 & 3 \\ 3 & 3 & 3 & 1 \end{bmatrix}$$

where variance and significance change for non reference blocks. In an example where variance differs for intra blocks, the matrix $O_1$ may be implemented for intra blocks as follows:

$$O_1 = \begin{bmatrix} 7 & 6 & 5 & 4 \\ 6 & 5 & 4 & 3 \\ 5 & 4 & 3 & 2 \\ 4 & 3 & 2 & 2 \end{bmatrix}$$

and for inter blocks as follows:

$$O_1 = \begin{bmatrix} 4 & 4 & 3 & 3 \\ 4 & 3 & 3 & 2 \\ 3 & 3 & 2 & 1 \\ 3 & 2 & 1 & 1 \end{bmatrix}$$

A more sophisticated scheme may be implemented where the matrix is changed based on reference/non-reference, intra/inter, or use of the macroblock variances and residuals variances directly.

The sixteen 3-bit programmable offsets $O_{ij}$ for 8×8 luma and chroma quantization may be utilized according to the following equation:

$$\text{Off}(i,j) = sgn(Y(i,j)) \cdot O_1(i,j),$$

where $O_1 = \begin{bmatrix} o_{00} & o_{01} & o_{02} & o_{02} & o_{03} & o_{03} & o_{03} & o_{03} \\ o_{10} & o_{11} & o_{12} & o_{12} & o_{13} & o_{13} & o_{13} & o_{13} \\ o_{20} & o_{21} & o_{22} & o_{22} & o_{23} & o_{23} & o_{23} & o_{23} \\ o_{20} & o_{21} & o_{22} & o_{22} & o_{23} & o_{23} & o_{23} & o_{23} \\ o_{30} & o_{31} & o_{32} & o_{32} & o_{33} & o_{33} & o_{33} & o_{33} \\ o_{30} & o_{31} & o_{32} & o_{32} & o_{33} & o_{33} & o_{33} & o_{33} \\ o_{30} & o_{31} & o_{32} & o_{32} & o_{33} & o_{33} & o_{33} & o_{33} \\ o_{30} & o_{31} & o_{32} & o_{32} & o_{33} & o_{33} & o_{33} & o_{33} \end{bmatrix}$ where the values in the square brackets are the same as in the 4×4 example above, but i and j=0 . . . 7.

The sixteen 4-bit programmable dead zones $d_{ij}$ for 4×4 luma and chroma quantization may be utilized according to the following equation:

$$DZ(i,j) = D_1(i,j), \text{ where } D_1 = \begin{bmatrix} d_{00} & d_{01} & d_{02} & d_{03} \\ d_{10} & d_{11} & d_{12} & d_{13} \\ d_{20} & d_{21} & d_{22} & d_{23} \\ d_{30} & d_{31} & d_{32} & d_{33} \end{bmatrix},$$

where $d_{ij}$=0 . . . 15. In one example, for smaller SAD blocks and/or non-reference blocks (e.g., B-frames), the value of $D_1$ may be set as follows:

$$D_1 = \begin{bmatrix} 0 & 0 & 0 & 2 \\ 0 & 0 & 2 & 5 \\ 0 & 2 & 3 & 5 \\ 2 & 5 & 5 & 10 \end{bmatrix}$$

Otherwise, the value of $D_1$ may be set as follows:

$$D_1 = \begin{bmatrix} 0 & 0 & 0 & 1 \\ 0 & 0 & 1 & 3 \\ 0 & 1 & 2 & 3 \\ 1 & 3 & 3 & 6 \end{bmatrix}$$

The intermediate values inside the square brackets in the above equations may have, in one example, a 32-bit range. However, the value Y may be implemented to fit in 16 bits.

The sixteen 4-bit programmable dead zones $d_{ij}$ for 8×8 luma and chroma quantization may be utilized according to the following equation:

$$DZ(i,j) = D_1(i,j),$$

where $$D_1 = \begin{bmatrix} d_{00} & d_{00} & d_{00} & d_{00} & d_{01} & d_{01} & d_{02} & d_{03} \\ d_{00} & d_{00} & d_{00} & d_{00} & d_{01} & d_{01} & d_{02} & d_{03} \\ d_{00} & d_{00} & d_{00} & d_{00} & d_{01} & d_{01} & d_{02} & d_{03} \\ d_{00} & d_{00} & d_{00} & d_{00} & d_{01} & d_{01} & d_{02} & d_{03} \\ d_{10} & d_{10} & d_{10} & d_{10} & d_{11} & d_{11} & d_{12} & d_{13} \\ d_{10} & d_{10} & d_{10} & d_{10} & d_{11} & d_{11} & d_{12} & d_{13} \\ d_{20} & d_{20} & d_{20} & d_{20} & d_{21} & d_{21} & d_{22} & d_{23} \\ d_{30} & d_{30} & d_{30} & d_{30} & d_{31} & d_{31} & d_{32} & d_{33} \end{bmatrix}$$

where the values in the square brackets are the same as in the 4×4 example above, but i and j=0 . . . 7.

For 4×4 luma DC transformation and quantization, the luma DC coefficients of a 16×16 block are grouped into a 4×4 block and further transformed, for intra frames, to improve compression. The forward transform for 4×4 luma DC transformation may be implemented as follows. The input matrix $X_D$ may be formed by picking out DC coefficients from the 16 transformed 4×4 blocks. DC coefficients may be transformed, for example, using a symmetric Hadamard transform. The symmetric Hadamard transform generally leads to essentially the same performance as the DCT-like transform in TML). The forward transform may be expressed by the following equation:

$$Y_D = \left( \begin{bmatrix} 1 & 1 & 1 & 1 \\ 1 & 1 & -1 & -1 \\ 1 & -1 & -1 & 1 \\ 1 & -1 & 1 & -1 \end{bmatrix} \begin{bmatrix} x_{D00} & x_{D01} & x_{D02} & x_{D03} \\ x_{D10} & x_{D11} & x_{D12} & x_{D13} \\ x_{D20} & x_{D21} & x_{D22} & x_{D23} \\ x_{D30} & x_{D31} & x_{D32} & x_{D33} \end{bmatrix} \begin{bmatrix} 1 & 1 & 1 & 1 \\ 1 & 1 & -1 & -1 \\ 1 & -1 & -1 & 1 \\ 1 & -1 & 1 & -1 \end{bmatrix} \right) // k_p$$

with $k_p = k_9 = 2$. The value p is generally related to a bitdepth of the input video. For example for 8-bit video the value $k_9$ is implemented. However, other values may be implemented for 10-bit and/or 12-bit input video.

The 4×4 luma DC quantization may be performed according to the following equation:

$$Y_{QQD}(i, j) = \left[ \begin{array}{l} Y_D(i, j) \cdot Q(QP\%6,0,0) + \\ ((\text{sgn}(Y_D(i, j)) \cdot (o_{LDC} + 1) \cdot 2^{17+QP/6})/16) \end{array} \right] \Big/ 2^{17-3+QP/6},$$

$$i, j = 0...3$$

$$Y_{QD}(i, j) = \begin{cases} 0, & \text{abs}(Y_{QQD}(i, j)) \leq 7 + d_{LDC} \\ Y_{QQD}(i, j)/8, & \text{else} \end{cases}$$

where $O_{LDC} = 0...7$, $d_{LDC} = 0...15$ (e.g., $O_{LDC} = 7$, $d_{LDC} = 0$).

The 2×2 chroma DC transform and quantization may be implemented as follows. In one example, the forward transform may be implemented by adding the chroma DC transform on top of the chroma transform. The input matrix may be formed by picking out DC coefficients from the 4 transformed 4×4 blocks. For example, denoting the coefficients as $X_D$, the transform may be computed according to the following equation.

$$Y_D = \left( \begin{bmatrix} 1 & 1 \\ 1 & -1 \end{bmatrix} \begin{bmatrix} x_{D00} & x_{D01} \\ x_{D10} & x_{D11} \end{bmatrix} \begin{bmatrix} 1 & 1 \\ 1 & -1 \end{bmatrix} \right) // k_p$$

with $k_p = k_9 = 1$.

The 2×2 chroma DC quantization may performed according to the following equation:

$$Y_{QQD}(i, j) = \left[ \begin{array}{l} Y_D(i, j) \cdot Q(QP\%6,0,0) + \\ ((\text{sgn}(Y_D(i, j)) \cdot (o_{CDC} + 1) \cdot 2^{17+QP/6})/16) \end{array} \right] \Big/ 2^{17-3+QP/6},$$

$$i, j = 0...3$$

$$Y_{QD}(i, j) = \begin{cases} 0, & \text{abs}(Y_{QQD}(i, j)) \leq 7 + d_{CDC} \\ Y_{QQD}(i, j)/8, & \text{else} \end{cases}$$

where $O_{CDC} = 0...7$, $$d_{CDC} = 0...15 \text{ (e.g., } O_{CDC} = 7, d_{CDC} = 0).$$

The dynamic range specifications for each stage may be summarized in the following TABLE 1:

TABLE 1

| | Precision | |
|---|---|---|
| | Input bits | Output bits |
| Luma and chroma transform and quantization | | |
| Forward transform | 9 | 15 |
| Quantization | 15 | 10 |
| De-quantization | 10 | 15 |
| Inverse transform | 15 | 9 |

TABLE 1-continued

| | Precision | |
|---|---|---|
| | Input bits | Output bits |
| Luma DC transform and quantization | | |
| transform | 13 | 16 |
| Quantization | 16 | 12 |
| Inverse transform | 12 | 12 |
| De-quantization | 12 | 15 |
| Chroma DC transform and quantization | | |
| transform | 13 | 15 |
| Quantization | 15 | 11 |
| Inverse transform | 11 | 11 |
| De-quantization | 11 | 15 |

The value in each cell generally corresponds to a 9-bit input residual.

In another example, the present invention may be implemented in a VC1 (a Society of Motion Picture and Television Engineers (SMPTE) standard based on Microsoft WMV9) compliant encoder/decoder. The present invention may modify forward transform and quantization specifications of the VC1 standard to provide for implementation of programmable offsets and dead zones. In one example, the present invention may be implemented as a stand alone device. In another example, the present invention may provide an implementation that re-uses MPEG2 or MPEG4 hardware.

In one example, the forward quantization of a given coefficient at an index (e.g., Idx) of a block may be implemented according to the following pseudocode:

```
Quantizer = (InvQuantScale * QuantMat[Idx] + 0x8000) >> 16;
Tmp = Coeffs[Idx] * Quantizer;
/* Handle rounding */
if (Tmp < 0)
{
    Tmp += ((~Qrnd & 0xf) << 12 | 0xfff;
}
else
{
    Tmp += Qrnd << 12;
}
QCoeffs[Idx] = Tmp >> 16;
``` where Quantizer represents the forward quantizer, InvQuantScale represents a scale factor for the block, QuantMat represents the forward quantization matrix, Coeffs represents the blocks of coefficients, Qrnd represents a rounding factor and QCoeffs represents a resulting quantized block. In one example, QuantMat[Idx] may be set to 16 and Qrnd may be set to a predetermined fixed value. In one example, the value Qrnd may be either 5 or 8 for intra pictures (I-pictures) and 0 or 1 for inter pictures. The particular value of Qrnd implemented may be determined based on user preference.

A programmable dead zone for VC1 may be implemented by varying the parameter Qrnd between a first predetermined value and a second predetermined value. In one example, Qrnd may be varied between 0 and 2^4 (or between 0 and 15 inclusive). Programmable independent coefficient offsets for VC1 may be implemented by varying the parameter QuantMat[Idx] between a first predetermined value and a second predetermined value. The value of QuantMat[Idx] may be implemented, in one example, having (i) a range of up to 16 bits and (ii) a positive sign (e.g., 0 to (2^16)−1). In one example, the value of QuantMat[Idx] may be varied between 0 and 31 inclusive.

The present invention may apply conventional MPEG-2 or MPEG-4 very large scale integrated (VLSI) implementations of quantization for standard-based VC1 encoding. For example, MPEG-2 parameters may be varied to apply programmable dead zones and offsets. In one example, MPEG-2 quantization matrices may be utilized in an alternative implementation of programmable offsets for VC1 quantization. Although the present invention has been illustrated with an 8-bit video input, other bitdepths (e.g., 10-bit, 12-bit, etc.) of input video streams may be implemented in accordance with the present invention. The present invention may also be implemented with other video formats (e.g., 4:2:2, 4:4:4, etc.). The present invention may provide advantages for Main Profile, High Profile and VC1 by matching quantization decisions to the coefficient distributions to improve rate-distortion performance of encoded bitstreams.

The function performed by the present invention may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
an encoder circuit configured to generate a plurality of coefficient values and motion vectors in response to a video stream, a first control signal selecting between intra and inter modes, a second control signal selecting between a plurality of transforms, and a number of quantized values;
a quantizer circuit configured to generate said number of quantized values in response to said coefficient values, a quantizer index signal, two or more quantization dead zones and two or more offsets, wherein a first coefficient value is quantized using a first quantization dead zone and a first offset, a second coefficient value is quantized using a second quantization dead zone and a second offset, said first and second quantization dead zones have different values and said first and second offsets have different values;
a control circuit configured to (i) generate said first control signal, said second control signal, said quantizer index signal, and a status signal indicating a transmission status and (ii) set said two or more quantization dead zones and said two or more offsets to different values, wherein said quantization dead zones and said offsets are independently programmable; and
an entropy encoder circuit configured to generate a compressed bit stream in response to the first control signal, the quantizer index signal, the status signal, the quantized values and the motion vectors, wherein
4×4 luma and chroma quantization is performed according to a first equation comprising $$Y_{QQ}(i,j) = [Y(i,j) \cdot Q(QP\%6, i, j) + (((\text{Off}(i,j)+1) \cdot 2^{17+QP/6})/16)]/$$
$$2^{17-3+QP/6}, i, j = 0 \ldots 3$$

$$Y_Q(i,j) = \begin{cases} 0, & \text{if } \text{abs}(Y_{QQ}(i,j)) \leq 7 + DZ(i,j) \\ Y_{QQ}(i,j)/8, & \text{else} \end{cases}$$

where Y represents the coefficient values, Q represents the quantization coefficients, Off(i,j) represents the offset values and DZ(i,j) represents the quantization dead zone values,
4×4 luma DC quantization is performed according to a second equation comprising $$Y_{QQD}(i,j) = [Y_D(i,j) \cdot Q(QP\%6, 0, 0) +$$
$$((sgn(Y_D(i,j)) \cdot (o_{LDC}+1) \cdot 2^{17+QP/6})/16)]/2^{17-3+QP/6}, i, j = 0 \ldots 3$$

$$Y_{QD}(i,j) = \begin{cases} 0, & \text{abs}(Y_{QQD}(i,j)) \leq 7 + d_{LDC} \\ Y_{QQD}(i,j)/8, & \text{else} \end{cases}$$

where $O_{LDC}=0 \ldots 7$ has a value ranging from zero through 7 and $d_{LDC}$ has a value ranging from zero through 15, and
2×2 chroma DC quantization is performed according to a third equation comprising $$Y_{QQD}(i,j) = [Y_D(i,j) \cdot Q(QP\%6, 0, 0) +$$
$$((sgn(Y_D(i,j)) \cdot (o_{CDC}+1) \cdot 2^{17+QP/6})/16)]/2^{17-3+QP/6}, i, j = 0 \ldots 3$$

$$Y_{QD}(i,j) = \begin{cases} 0, & \text{abs}(Y_{QQD}(i,j)) \leq 7 + d_{CDC} \\ Y_{QQD}(i,j)/8, & \text{else} \end{cases}$$

where $O_{CDC}$ has a value ranging from zero through 7 and $d_{CDC}$ has a value ranging from zero through 15.

2. The apparatus according to claim 1, wherein said encoder circuit is compliant with one or more encoding standards selected from the group consisting of MPEG1, MPEG2, MPEG4, WMV, VC9, VC1, H.262, H.263, H.264, H.264/JVC/AV/MPEG4 part 10, and AVS 1.0.

3. The apparatus according to claim 1, wherein said control circuit is further configured to provide a plurality of dead zone threshold values and offset threshold values.

4. The apparatus according to claim 1, wherein said control circuit is configured to provide a plurality of parameter sets.

5. The apparatus according to claim 4, wherein said plurality of parameter sets comprises a plurality of parameter pairs.

6. The apparatus according to claim 5, wherein said plurality of parameter pairs each comprise an offset parameter and a dead zone parameter.

7. The apparatus according to claim 4, wherein said plurality of parameter sets comprises 16 parameter sets configured for either 8×8 or 4×4 luma and chroma quantization, one parameter set configured for 2×2 chroma DC quantization and one parameter set configured for 4×4 luma DC quantization.

8. The apparatus according to claim 1, wherein said encoder circuit comprises a VC1 compliant encoder/decoder (CODEC) and said quantizer circuit is configured to implement a variable dead zone comprising a rounding factor configured to vary between a first predetermined value and a second predetermined value.

9. The apparatus according to claim 1, wherein said quantizer circuit is further configured to implement a programmable offset for standard-based VC1 encoding, wherein a forward quantization matrix parameter is variable between a first predetermined value and a second predetermined value.

10. A video encoder comprising:
- means for generating a plurality of coefficient values and motion vectors in response to a video stream, a first control signal selecting between intra and inter modes, a second control signal selecting between a plurality of transforms, and a number of quantized values;
- means for generating said number of quantized values in response to said coefficient values, a quantizer index signal, two or more quantization dead zones and two or more offsets, wherein a first coefficient value is quantized using a first quantization dead zone and a first offset, a second coefficient value is quantized using a second quantization dead zone and a second offset, said first and second quantization dead zones have different values and said first and second offsets have different values;
- means for (i) generating said first control signal, said second control signal, said quantizer index signal, and a status signal indicating a transmission status and (ii) setting said two or more quantization dead zones and said two or more offsets to different values, wherein said two or more quantization dead zones and said two or more offsets are independently programmable; and
- means for generating a compressed bit stream using entropy encoding in response to the first control signal, the quantizer index signal, the status signal, the quantized values and the motion vectors, wherein
  4×4 luma and chroma quantization is performed according to a first equation comprising $$Y_{QQ}(i, j) = [Y(i, j) \cdot Q(QP\%6, i, j) + (((\text{Off}(i, j) + 1) \cdot 2^{17+QP/6})/16)]/2^{17-3+QP/6}, i, j = 0\ldots3$$

$$Y_Q(i, j) = \begin{cases} 0, & \text{if abs}(Y_{QQ}(i, j)) \leq 7 + DZ(i, j) \\ Y_{QQ}(i, j)/8, & \text{else} \end{cases}$$

where Y represents the coefficient values, Q represents the quantization coefficients, Off(i,j) represents the offset values and DZ(i,j) represents the quantization dead zone values,
  4×4 luma DC quantization is performed according to a second equation comprising $$Y_{QQD}(i, j) = [Y_D(i, j) \cdot Q(QP\%6, 0, 0) +$$

$$((sgn(Y_D(i, j)) \cdot (o_{LDC} + 1) \cdot 2^{17+QP/6})/16)]/2^{17-3+QP/6}, i, j = 0\ldots3$$

$$Y_{QD}(i, j) = \begin{cases} 0, & \text{abs}(Y_{QQD}(i, j)) \leq 7 + d_{LDC} \\ Y_{QQD}(i, j)/8, & \text{else} \end{cases}$$

where $O_{LDC} = 0 \ldots 7$ has a value ranging from zero through 7 and $d_{LDC}$ has a value ranging from zero through 15, and
  2×2 chroma DC quantization is performed according to a third equation comprising $$Y_{QQD}(i, j) = [Y_D(i, j) \cdot Q(QP\%6, 0, 0) +$$

$$((sgn(Y_D(i, j)) \cdot (o_{CDC} + 1) \cdot 2^{17+QP/6})/16)]/2^{17-3+QP/6}, i, j = 0\ldots3$$

$$Y_{QD}(i, j) = \begin{cases} 0, & \text{abs}(Y_{QQD}(i, j)) \leq 7 + d_{CDC} \\ Y_{QQD}(i, j)/8, & \text{else} \end{cases}$$

where $O_{CDC}$ has a value ranging from zero through 7 and $d_{CDC}$ has a value ranging from zero through 15.

11. A method for encoding video comprising:
- generating a plurality of coefficient values and motion vectors with a video encoder in response to a video stream, a first control signal selecting between intra and inter modes, a second control signal selecting between a plurality of transforms, and a number of quantized values;
- generating said number of quantized values with said video encoder in response to said coefficient values, a quantizer index signal, two or more quantization dead zones and two or more offsets, wherein a first coefficient value is quantized using a first quantization dead zone and a first offset, a second coefficient value is quantized using a second quantization dead zone and a second offset, said first and second quantization dead zones have different values and said first and second offsets have different values;
- generating said first control signal, said second control signal, said quantizer index signal, and a status signal indicating a transmission status;
- setting said two or more quantization dead zones and said two or more offsets to different values, wherein said two or more quantization dead zones and said two or more offsets are independently programmable; and
- generating a compressed bit stream with said video encoder using entropy encoding in response to the first control signal, the quantizer index signal, the status signal, the quantized values and the motion vectors, wherein
  4×4 luma and chroma quantization is performed according to a first equation comprising $$Y_{QQ}(i, j) = [Y(i, j) \cdot Q(QP\%6, i, j) + (((\text{Off}(i, j) + 1) \cdot 2^{17+QP/6})/16)]/2^{17-3+QP/6}, i, j = 0\ldots3$$

$$Y_Q(i, j) = \begin{cases} 0, & \text{if abs}(Y_{QQ}(i, j)) \leq 7 + DZ(i, j) \\ Y_{QQ}(i, j)/8, & \text{else} \end{cases}$$

where Y represents the coefficient values, Q represents the quantization coefficients, Off(i,j) represents the offset values and DZ(i,j) represents the quantization dead zone values,
  4×4 luma DC quantization is performed according to a second equation comprising $$Y_{QQD}(i, j) = [Y_D(i, j) \cdot Q(QP\%6, 0, 0) +$$

$$((sgn(Y_D(i, j)) \cdot (o_{LDC} + 1) \cdot 2^{17+QP/6})/16)]/2^{17-3+QP/6}, i, j = 0\ldots3$$

-continued $$Y_{QD}(i, j) = \begin{cases} 0, & \text{abs}(Y_{QQD}(i, j)) \leq 7 + d_{LDC} \\ Y_{QQD}(i, j)/8, & \text{else} \end{cases}$$

where $O_{LDC}=0 \ldots 7$ has a value ranging from zero through 7 and $d_{LDC}$ has a value ranging from zero through 15, and 2×2 chroma DC quantization is performed according to a third equation comprising $$Y_{QQD}(i, j) = [Y_D(i, j) \cdot Q(QP\%6, 0, 0) +$$

$$((sgn(Y_D(i,j))\cdot(o_{CDC}+1)\cdot 2^{17+QP/6})/16)]/2^{17-3+QP/6}, i, j = 0\ldots 3$$

$$Y_{QD}(i, j) = \begin{cases} 0, & \text{abs}(Y_{QQD}(i, j)) \leq 7 + d_{CDC} \\ Y_{QQD}(i, j)/8, & \text{else} \end{cases}$$

where $O_{CDC}$ has a value ranging from zero through 7 and $d_{CDC}$ has a value ranging from zero through 15.

12. The method according to claim 11, further comprising: implementing said video encoder as an encoder circuit compliant with one or more encoding standards selected from the group consisting of MPEG1, MPEG2, MPEG4, WMV1 VC9, VC1, H.262, H.263, H.264, H.264/JVC/AV/MPEG4 part 10, and AVS 1.0.

13. The method according to claim 11, further comprising: providing a plurality of dead zone threshold values and offset threshold values.

14. The method according to claim 11, further comprising: providing a plurality of parameter sets.

15. The method according to claim 14, wherein said plurality of parameter sets comprises a plurality of parameter pairs.

16. The method according to claim 15, wherein said plurality of parameter pairs each comprise an offset parameter and a dead zone parameter.

17. The method according to claim 14, wherein said plurality of parameter sets comprises 16 parameter sets configured for either 8×8 or 4×4 luma and chroma quantization, one parameter set configured for 2×2 chroma DC quantization and one parameter set configured for 4×4 luma DC quantization.

18. The method according to claim 11, further comprising: implementing said video encoder as a VC1 compliant encoder/decoder (CODEC) and a quantizer circuit configured to implement a variable dead zone comprising a rounding factor configured to vary between a first predetermined value and a second predetermined value.

19. The method according to claim 11, further comprising: implementing said video encoder as a VC1 compliant encoder/decoder (CODEC) and a quantizer circuit configured to implement a programmable offset for standard-based VC1 encoding, wherein a forward quantization matrix parameter is variable between a first predetermined value and a second predetermined value.

20. The method according to claim 11, further comprising: implementing said video encoder as a VC1 compliant encoder/decoder (CODEC) and a quantizer circuit configured to implement (i) a variable dead zone comprising a rounding factor configured to vary between a first predetermined value and a second predetermined value and (ii) a programmable offset for standard base VC1 encoding, wherein a forward quantization matrix parameter is variable between a third predetermined value and a fourth predetermined value.

21. The apparatus according to claim 1, wherein said entropy encoder circuit uses one or more of variable length codes (VLC), context-adaptive variable length coding (CAVLC) and context-adaptive binary arithmetic coding (CABAC).

22. The method according to claim 11, wherein:
sixteen 3-bit programmable offsets $O_{ij}$ for 4×4 luma and chroma quantization are utilized according to a first equation $$\text{Off}(i, j) = sgn(Y(i, j)) \cdot O_1(i, j), \text{ where } O_1 = \begin{bmatrix} o_{00} & o_{01} & o_{02} & o_{03} \\ o_{10} & o_{11} & o_{12} & o_{13} \\ o_{20} & o_{21} & o_{22} & o_{23} \\ o_{30} & o_{31} & o_{32} & o_{33} \end{bmatrix}$$

where $O_{ij}$ has a value ranging from zero through seven; and sixteen 4-bit programmable dead zones $d_{ij}$ for 4×4 luma and chroma quantization are utilized according to a second equation $$DZ(i, j) = D_1(i, j), \text{ where } D_1 = \begin{bmatrix} d_{00} & d_{01} & d_{02} & d_{03} \\ d_{10} & d_{11} & d_{12} & d_{13} \\ d_{20} & d_{21} & d_{22} & d_{23} \\ d_{30} & d_{31} & d_{32} & d_{33} \end{bmatrix},$$

where $d_{ij}$ has a value ranging from zero through fifteen.

23. The method according to claim 11, wherein:
sixteen 3-bit programmable offsets $O_{ij}$ for 8×8 luma and chroma quantization are utilized according to a third equation $$\text{Off}(i, j) = sgn(Y(i, j)) \cdot O_1(i, j),$$

$$\text{where } O_1 = \begin{bmatrix} o_{00} & o_{01} & o_{02} & o_{02} & o_{03} & o_{03} & o_{03} & o_{03} \\ o_{10} & o_{11} & o_{12} & o_{12} & o_{13} & o_{13} & o_{13} & o_{13} \\ o_{20} & o_{21} & o_{22} & o_{22} & o_{23} & o_{23} & o_{23} & o_{23} \\ o_{20} & o_{21} & o_{22} & o_{22} & o_{23} & o_{23} & o_{23} & o_{23} \\ o_{30} & o_{31} & o_{32} & o_{32} & o_{33} & o_{33} & o_{33} & o_{33} \\ o_{30} & o_{31} & o_{32} & o_{32} & o_{33} & o_{33} & o_{33} & o_{33} \\ o_{30} & o_{31} & o_{32} & o_{32} & o_{33} & o_{33} & o_{33} & o_{33} \\ o_{30} & o_{31} & o_{32} & o_{32} & o_{33} & o_{33} & o_{33} & o_{33} \end{bmatrix}$$

and sixteen 4-bit programmable dead zones $d_{ij}$ for 8×8 luma and chroma quantization are utilized according to a fourth equation $$DZ(i, j) = D_1(i, j),$$

$$\text{where } D_1 = \begin{bmatrix} d_{00} & d_{00} & d_{00} & d_{00} & d_{01} & d_{01} & d_{02} & d_{03} \\ d_{00} & d_{00} & d_{00} & d_{00} & d_{01} & d_{01} & d_{02} & d_{03} \\ d_{00} & d_{00} & d_{00} & d_{00} & d_{01} & d_{01} & d_{02} & d_{03} \\ d_{00} & d_{00} & d_{00} & d_{00} & d_{01} & d_{01} & d_{02} & d_{03} \\ d_{10} & d_{10} & d_{10} & d_{10} & d_{11} & d_{11} & d_{12} & d_{13} \\ d_{10} & d_{10} & d_{10} & d_{10} & d_{11} & d_{11} & d_{12} & d_{13} \\ d_{20} & d_{20} & d_{20} & d_{20} & d_{21} & d_{21} & d_{22} & d_{23} \\ d_{30} & d_{30} & d_{30} & d_{30} & d_{31} & d_{31} & d_{32} & d_{33} \end{bmatrix}$$

where the values in the square brackets correspond to the respective values used for 4×4 luma and chroma quantization, but i and j range from zero to seven.

24. The method according to claim 11, wherein values of the quantization dead zones and offsets are variable for each macroblock.

* * * * *